July 24, 1934.    J. D. MORGAN    1,967,719
BOX DUMPING DEVICE
Filed Aug. 23, 1933    2 Sheets-Sheet 1

Inventor
Josiah D. Morgan
By Francis C. Huebner
Attorney

July 24, 1934.  J. D. MORGAN  1,967,719
BOX DUMPING DEVICE
Filed Aug. 23, 1933  2 Sheets-Sheet 2
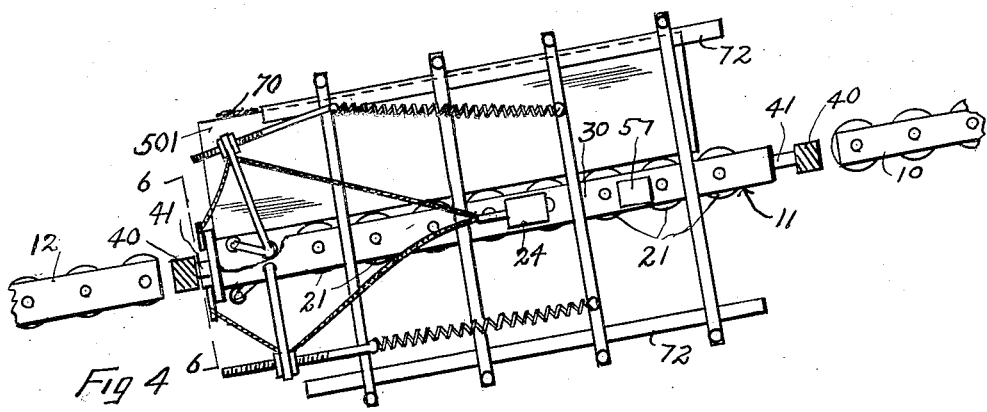
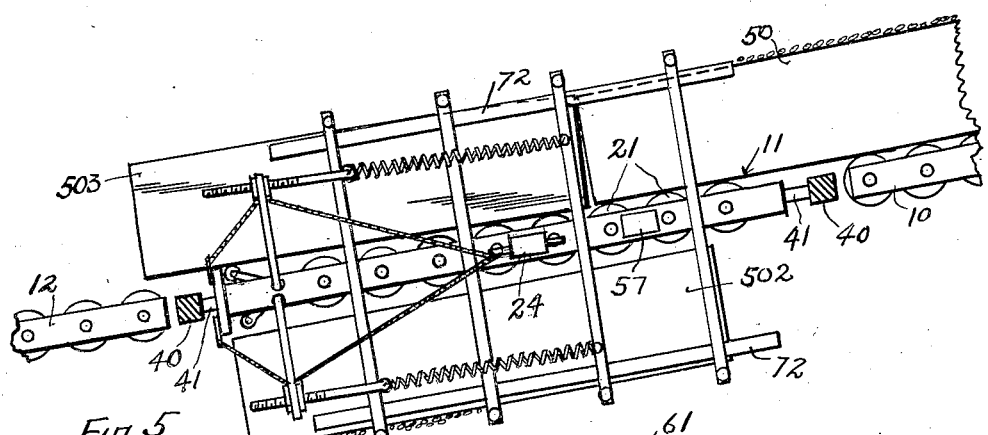
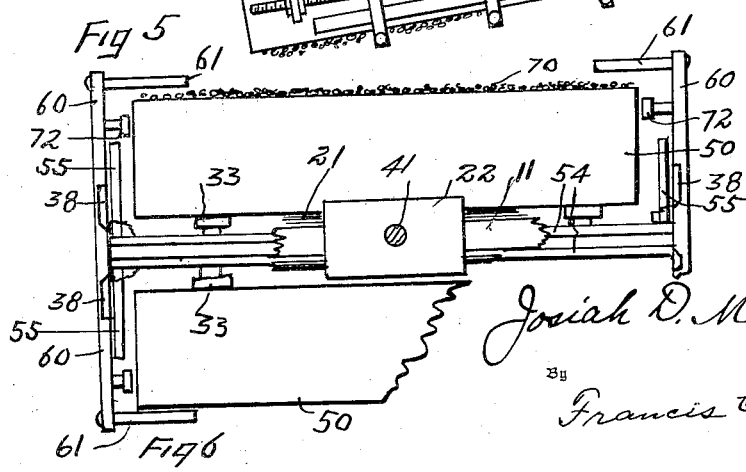

Patented July 24, 1934

1,967,719

UNITED STATES PATENT OFFICE 1,967,719

BOX DUMPING DEVICE

Josiah D. Morgan, Fresno, Calif.

Application August 23, 1933, Serial No. 686,403

5 Claims. (Cl. 214—1.1)

My invention relates to a device for dumping the contents of boxes into a common hopper. In industry, raisins, dried fruits, fresh fruits, cereals and similar merchandise are transported to the packing, or processing houses in boxes which are usually of uniform shape and size, and the contents of the boxes are then dumped into a common hopper to feed a distributing system or a processing system. Heretofore these boxes have been dumped manually. My invention relates to a device for automatically dumping boxes, the weight of the boxes containing merchandise being positioned in connection with counterweights so that gravity will form the motive power for operating the device. The object attained by my invention is mechanism adapted to automatically make use of gravity power for dumping boxes for the purpose of spilling the contents thereof.

Figure 1:
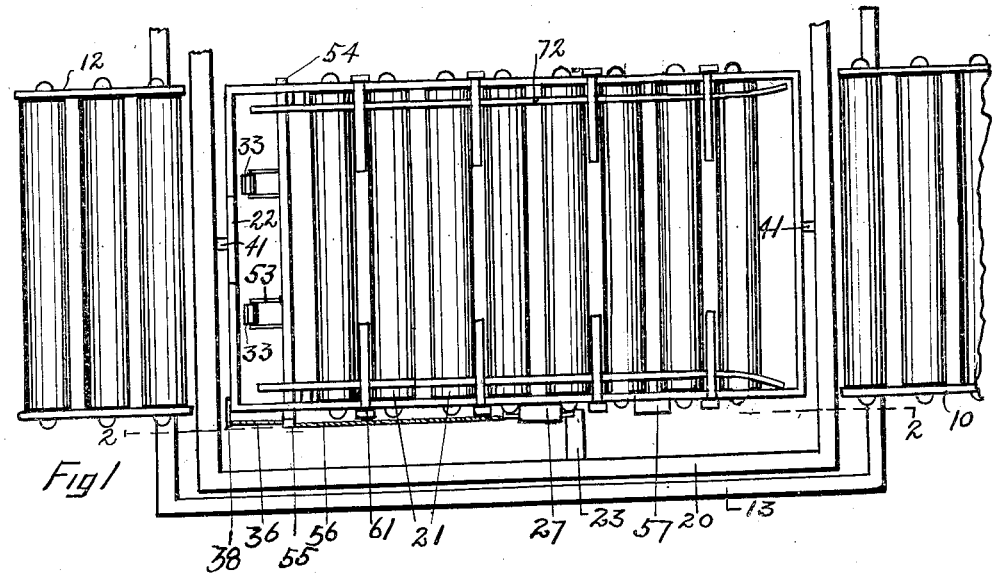
Figure 2:
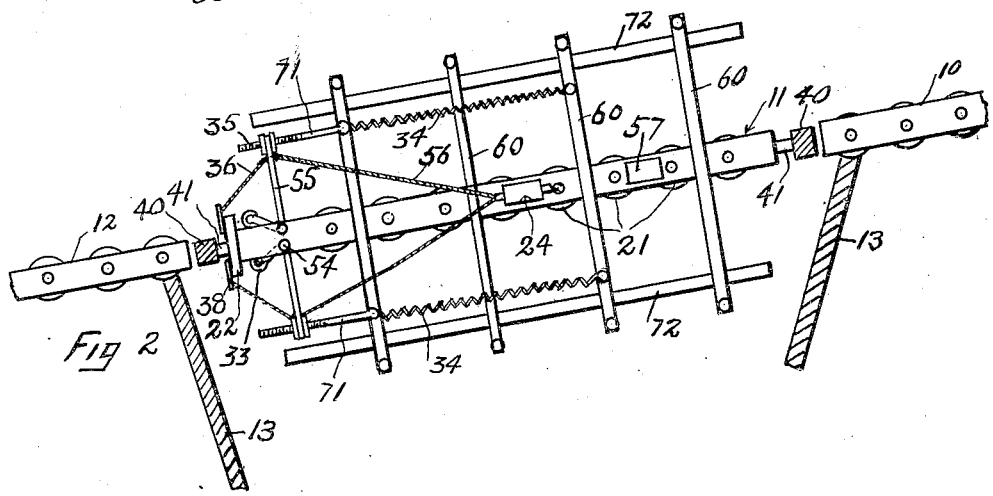
Figure 3:
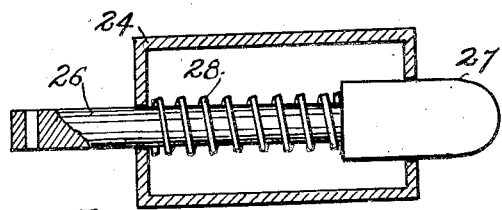

In the drawings accompanying this specification and forming a part hereof, Fig. 1 is a top plan view of the device. Fig. 2 is a side view of the device along section line 2—2 in Fig. 1. Fig. 3 is an enlarged view of the catch, or trip, being shown partly in section. Fig. 4 is a view similar to Fig. 2 showing a box containing merchandise positioned to trip the device so that the box will turn over. Fig. 5 is a view similar to that in Fig. 4 showing a box thereon in position for spilling the contents, showing a second box being moved on to the platform, and an empty box being shoved off the platform. Fig. 6 is an end view of the device along the broken line 6—6 in Fig. 4.

Referring to the drawings, I have provided a conveyor 10 for transporting boxes 50, which boxes may contain merchandise to be spilled or dumped. Conveyor 10 should extend from the place of supply of the filled boxes, not shown in the drawings, to the dumping platform 11. A discharge conveyor 12 for removing the empty boxes is shown at the discharge end of the dumping platform. Conveyors 10 and 12 should be aligned with the dumping platform 11. It is preferable that said conveyors and platform should be on a slope from the point of supply downward to the place of discharge. A box or hopper 13 for receiving the spilled merchandise is positioned directly under the dumping platform.

The dumping platform consists of a rectangular frame 20 preferably slightly longer and wider than the box to be dumped. Within frame 20 are mounted a plurality of rollers 21. These rollers are preferably uniform in diameter and the axes thereof are positioned parallel with each other and on a common plane. Frame 20 is pivotally mounted within a stationary frame 40, the pivotal mountings 41 at either end of the frame 20 and at right angles to the axes of rollers 21 being adapted as pivots for said frame 20.

In order to facilitate the movement of the boxes on to and off of the platform by gravity, the platform should be positioned on an incline with the discharge end lower than the receiving end. Adjacent to the discharge end of the dumping platform is a box stop 22.

For the purpose of holding the dumping platform normally on the same plane as the plane of conveyors 10 and 12, a catch is provided to cooperate with stops 23. Stops 23 are on either side of stationary frame 40. The catch consists of a housing 24 which is attached to one side of the dumping platform. Extending through said housing is a sliding bolt 26 which has an enlarged end 27. The sliding bolt is normally held by a spring 28 so that the enlarged end extends beyond said housing, as shown more definitely in Fig. 3. Spring 28 can be compressed so as to permit the sliding bolt to be moved so that the enlarged portion 27 can enter the housing. It will be noted that the relative positions of stops 23 on stationary frame 40 and the housing on the dumping frame will permit the bolt to engage one of stops 23 when it emerges from the housing, and when said bolt is moved within the housing it will be disengaged with said stop.

The device for tripping said catch consists of the following elements: Duplicate pairs of rollers 33 are mounted on risers 53 which risers are attached to a rod 54, which rod is pivotally mounted in frame 11. The axes of rods 54 and rollers 21 should be parallel. The swing of the risers 54 should be sufficient to permit the periphery of rollers 33 to be on a plane of the peripheries of rollers 21, and likewise to be extended above stop 22. Arms 55 are attached to rod 54 so that the movements of arms 55 are communicated directly to rod 54 and thereby to rollers 33. By means of springs 34 the rollers 33 are normally held in a position with the periphery of the rollers 33 above the periphery of rollers 21, and in a position so that the box stop 22 would not function as a stop. A chain or line 56 is attached to post 55 and to an end of sliding bolt 26. It will be noted that when rollers 33 are depressed, catch 27 will be disengaged from stop 23. A counter weight 57 attached to one side of the dumping platform 11 will start the dumping platform to swing on its axis when catch 27 is disengaged from stop 23. A permanent stop 63 is positioned on frame 40 a spaced distance from stop 23 and directly above it, the function of this stop being to prevent the dumping platform from having a complete rotation, but stopping the rotation when the dumping platform is on an approximate plane of conveyors 10 and 12. A chain 36 is adapted to limit the swing of arm 55.

When a weighted box is moved from conveyor 10 over rollers 21 it will engage with rollers 33, and if the weight is sufficient to overcome the tension of spring 34, rollers 33 will be depressed so the weighted box will engage stop 22, and thus remain on the dumping platform. By the downward pressure on rollers 33 catch 27 is released, and the platform with the weighted box thereon will swing to a position so that the box is up side down, and the contents can be thus spilled. When in this position the opposite face of the dumping platform is uppermost and ready to receive a weighted box. It is here noted that the two faces of the dumping platform are duplicates, and the assembly consisting of rollers 33, risers 53, rod 54, arm 55, spring 34, and chains 36 and 56, and box stop 22 are duplicated on each face of the dumping platform.

Spring 34 should be adjusted as to strength so that a weighted box will depress rollers 33, while an empty box would not depress the rollers, but would lift the end of the box so that it will not engage stop 22.

The means for holding the box on to the dumping platform when the box is on the under side of said platform, consists of upright posts 60 which are slightly longer than the height of the box, and retaining members 61 attached thereto. It is noted that when a weighted box is on the dumping platform and the catch is released, the platform will start rotating on its pivots and the momentum will carry the dumping platform in approximately a half circle.

The device operates as follows: A weighted box 501 is conveyed on to the dumping platform. The weighted box will depress rollers 33, and thus make stop 22 operative to retain the box on the dumping platform in position 501 shown in Fig. 4. The depression of rollers 33 also releases catch 27, and counterweight 57 starts the dumping platform to turn on its axis consisting of pivots 41. The box is retained on the dumping platform while it is turning by means of retaining members 61. The contents of the box will be spilled when the box is up side down on the dumping platform, which is shown by position 502 in Fig. 5. The momentum of the dumping platform in turning, combined with the fact that the box is emptied and on the under side of the dumping platform will function to bring the dumping platform to the position so that the face of the platform opposite the face adjacent to box 501 is on a plane with conveyor 10, and the catch has functioned to normally hold the dumping platform in that position. While in this position another weighted box is run onto the dumping platform, and the function of dumping is repeated, and the emptied box on the opposite face of the dumping platform is on the top. Spring 34 holds rollers 33 in an upward position so that stop 22 does not function as a stop for an empty or light box, and the weighted box 50 when conveyed to the dumping platform will push the empty box to the position 503 shown in Figure 5, and off of the platform to the discharge conveyor.

The merchandise in the weighted boxes is designated 70. The screw eyes which are adapted to adjust the strength of springs 34 are designated 71.

Having described my invention I claim:

1. In a device of the character described a dumping platform consisting of a base member adapted to hold a box, said base member being pivotally mounted and adapted to swing on its axis, stop means attached at one end to said base member adapted to normally engage a box moved thereon, yielding means adapted to normally make said stop ineffective for the purpose of engagaing said box, a catch adapted to hold the base member in a fixed position with relation to swinging on its axis, said yielding means being adapted as a trip for said catch when the yielding means is depressed so that the stop will normally function contemporaneously with the trip to engage said box.

2. In a dumping platform adapted to dump boxes, the combination of a base member pivotally mounted, and having two opposite faces, each of said faces being adapted to hold a box, said base member having a receiving end and a discharge end, a block at the discharge end adapted to normally hold a box from being discharged therefrom, a stop adapted to normally hold the platform or base member in a fixed position for receiving boxes to be dumped, a catch member attached to said pivotally mounted member and adapted to cooperate with the stop, a trip adapted to release said catch when a prescribed minimum weight is applied to said trip, said trip being positioned adjacent to said stop and above said stop when normally inactive as to said catch, and below said stop when active with said catch.

3. In a device for dumping boxes, said device having a platform pivotally mounted and adapted to be turned over on said pivots, of the combination of a catch adapted to hold said platform in a position for receiving said boxes, a trip for releasing said catch, said trip having a lever yieldingly held in a normally raised position and in the path of travel of the box on to the platform, said trip being held in said normal position by means of a spring, said trip having a rounded periphery and adapted for boxes to slide thereover, stop means attached to an end of the platform in the line of travel of the box over said platform, said stop means being within the path of the box and operative when the said trip is depressed, and said stop means being inoperative when the trip is not depressed by reason of the fact that said trip extends normally above said stop, said trip being adapted to be depressed only when a predetermined weight, or a greater weight is placed thereon.

4. In a dumping platform adapted to dump boxes, the combination of a base member adapted to hold a box, said base member being pivotally mounted and adapted to be turned on its pivots, stop means attached to said base member adapted to normally engage a box moved thereon, a trip member pivotally mounted and having rollers in the ends thereof, positioned adjacent to the stop means, yielding means adapted to hold the trip member in a raised position, and adapted to form a path for the boxes on said platform to pass thereover and over said stop, the yielding means being formed with a predetermined strength so that a box of a weight greater than a predetermined amount will depress said trip member, catch means for holding the base member in a position for receiving boxes, and trip means for said catch adapted to be actuated when the trip member is depressed.

5. In a dumping device the combination of a platform pivotally mounted, having two opposite faces, each of said faces being adapted to hold a box, catch means adapted to normally hold said platform so that one of said faces is positioned to receive a box, stop means adapted to normally engage a box which has been conveyed to said platform, a trip member pivotally mounted in a position where it can be raised to a position to make said stop inoperative, or lowered to a position so that said stop is operative, yielding means adapted to normally hold said trip member in a raised position to make said stop means inoperative, said yielding means being adapted when a predetermined weight is placed on the trip member to depress said trip member so that said stop is operative, said catch being adapted to be tripped when the trip member is depressed, and means for holding the box on to said platform when the platform is turned so the box is inverted.

JOSIAH D. MORGAN.